United States Patent [19]

Kawasaki

[11] 4,112,441

[45] Sep. 5, 1978

[54] EXPOSURE CONTROL DEVICE

[75] Inventor: Masahiro Kawasaki, Tokyo, Japan

[73] Assignee: Asahi Kogaku Kogyo Kabushiki Kaisha, Tokyo, Japan

[21] Appl. No.: 644,012

[22] Filed: Dec. 24, 1975

[30] Foreign Application Priority Data

Dec. 26, 1974 [JP] Japan ............... 50-4470[U]

[51] Int. Cl.$^2$ .............................. G03B 7/08
[52] U.S. Cl. ....................... 354/24; 354/37; 354/38
[58] Field of Search ............ 354/23 R, 23 D, 24, 354/26, 28, 30, 36, 37, 38, 39, 40, 41, 43, 45, 47, 48, 50, 51, 60 R

[56] References Cited

U.S. PATENT DOCUMENTS

| 3,554,104 | 1/1971 | Winkler et al. | 354/38 |
| 3,638,544 | 2/1972 | Kitai | 354/51 |
| 3,829,867 | 8/1974 | Ono | 354/28 |
| 3,863,263 | 1/1975 | Itagaki | 354/24 |
| 3,896,456 | 7/1975 | Toyoda | 354/24 |
| 3,896,460 | 7/1975 | Sahara et al. | 354/38 |
| 3,945,024 | 3/1976 | Hasegawa et al. | 354/29 |
| 3,950,765 | 4/1976 | Nanba et al. | 354/29 |
| 3,964,073 | 6/1976 | Korbori et al. | 354/60 R |

FOREIGN PATENT DOCUMENTS 2,434,152  2/1975  Fed. Rep. of Germany ........ 354/23 D Primary Examiner—Russell E. Adams
Attorney, Agent, or Firm—Sughrue, Rothwell, Mion, Zinn and Macpeak

[57] ABSTRACT

An automatic exposure control device for a camera capable of aperture preferred (ES), shutter preferred (EE), and programmed (ES-EE) operation. Transducers and log compression electronic devices develop voltages dependent upon the Bv, Sv, Av and Tv values either manually or automatically set in the camera. Other circuit means adds and subtracts the voltages to satisfy the equation Bv + Sv = Av + Tv, and to thereby generate either Av, Tv or both, depending on the mode of operation. A diaphragm control apparatus is connected to respond to the circuit in dependence upon the values Tv, Bv and Sv during the EE and ES-EE modes. During the latter mode the Tv set into the circuit will not necessarily be the same Tv satisfying the equation above. During the ES mode the shutter speed is controlled in dependence upon the values Bv, Sv and Av.

3 Claims, 3 Drawing Figures

EXPOSURE CONTROL DEVICE

CROSS REFERENCE TO RELATED APPLICATION

Reference is made to the following two related applications filed on the same date herewith which are incorporated herein by reference:

(1) "Exposure Control Device" by Naoyuki Uno, Tetsuji Shono, Fumio Urano and Masahiro Kawasaki, corresponding to U.S. application Ser. No. 643,658. (2) "Automatic Exposure Control Device" by Naoyuki Uno, Tetsuji Shono, Fumio Urano and Masahiro Kawasaki, corresponding to U.S. application Ser. No. 644,018.

BACKGROUND OF THE INVENTION

The present invention relates to an automatic exposure control device for use with a camera, and in particular relates to an automatic exposure control device which can selectively accomplish either the aperture dominant or the shutter dominant type of automatic exposure control operations.

In the so-called automatic exposure control operation of the shutter speed dominant type (hereinafter referred to as "EE mode operation") wherein the aperture level of a photographic lens system is automatically controlled in response to the brightness of an object, the sensitivity of the film and the set exposure time, it is possible to take into consideration the motion of the object in deciding on the shutter speed. However, in EE operation the depth of field is constrained to follow the result coming from the aperture level of the photographic lens system which is determined automatically by the EE operation device used. Thus, EE mode operation is not completely satisfactory, because the depth of field is the most important picturing element in the case where the object is a still article.

On the other hand, a contrary situation exists for the so-called "automatic exposure control operation of the aperture dominant type" (hereinafter referred to as "ES mode operation") wherein the exposure time of a shutter is automatically controlled in response to the brightness of an object, the film sensitivity and the set aperture level of the photographic lens system. A defect, however, is that an excessive exposure time may be imparted to an object of swift motion, because the selection of shutter speed is not left to a photographer.

In the so-called "automatic exposure control operation of the programmed type" (hereafter referred to as "ES-EE mode operation"), wherein the predetermined combination of the aperture level and the exposure time is automatically controlled as a result of the brightness of an object and the film sensitivity, consideration is taken neither for swiftness of motion of the object nor for the depth of field but only for affording a proper exposure.

As will be apparent it is not possible to expect satisfactory results for all cases if the automatic exposure control operation is one of the three conventional methods mentioned above.

SUMMARY OF THE INVENTION

It is therefore an object of the invention to provide an automatic exposure control device in which selection can simply be made between, EE, ES, and EE-ES operations.

In accordance with the present invention an automatic exposure control device is provided, which can be selectively switched to any one of the three modes; ES, EE, and ES-EE. The device includes circuit elements for developing voltages corresponding to the APEX indication values of Av, Bv, Tv and Sv. The switches are arranged in the circuit to permit Bv, Sv and the manually set Tv, to control an automatic diaphragm control mechanism during the EE and the ES-EE modes. During the former mode, the Tv set into the circuit directly controls the shutter time. During the latter mode, a fixed Tv is set into the circuit, but the shutter time is none-the-less controlled by the Bv, Sv and automatically generated Av. When the circuit is switched to the ES mode the manual setting of the diaphragm controls the Av put into the circuit. The shutter time is then controlled by the latter Av, and the Bv and Sv.

DETAILED DESCRIPTION OF THE INVENTION

Figure 1:
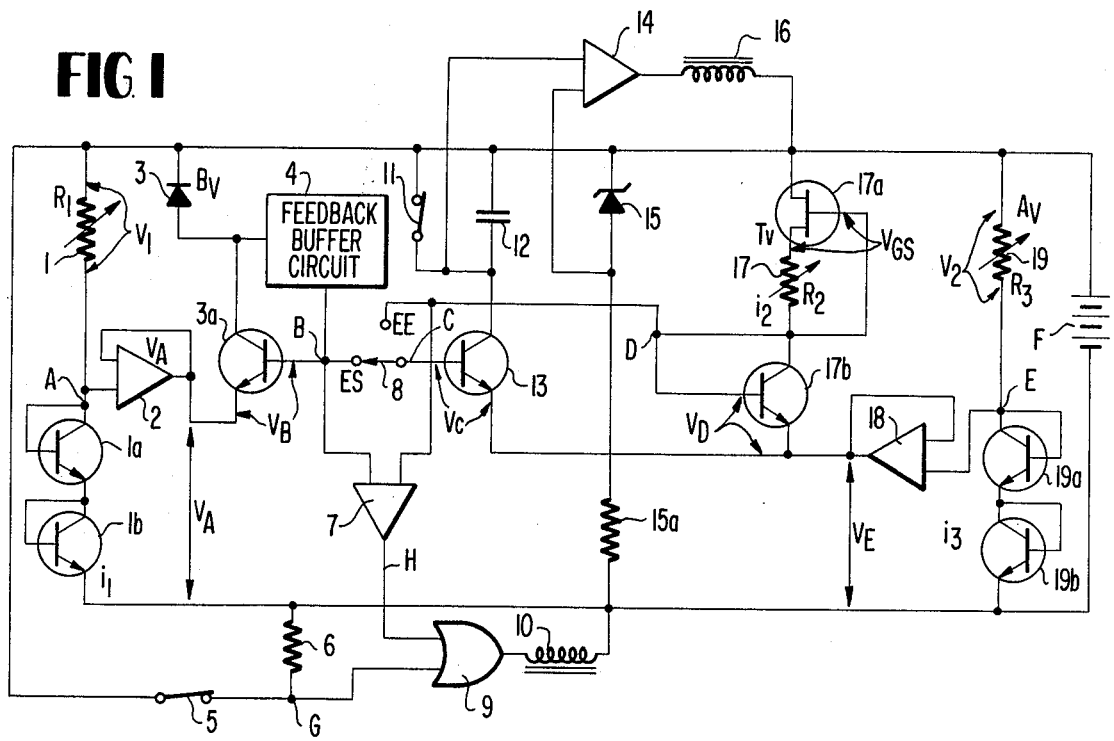
FIG. 1 is a circuit diagram of the automatic exposure control device according to the present invention.

Referring to FIG. 1, a variable resistor 1, which is adjustable to correspond to the film sensitivity, and a pair of logarithmic compression transistors 1a and 1b, connected in a diode configuration, are connected in series with each other across a constant voltage power source F. The connecting point A therebetween is connected to an input terminal of an operational amplifier 2 which is connected as a voltage follower circuit. A logarithmic compression transistor 3a has its collector connected with a phototransistor 3, its emitter connected to the output of operational amplifier 2, and its base connected to its collector via a feedback buffer circuit 4. The photodiode 3 provides a current dependent upon the brightness of the object seen by the lens system.

A variable resistor 19, which is adjustable in accordance with the aperture level selected, is connected in series with logarithmic compression transistors 19a and 19b, which in turn are connected as diodes. The latter series circuit is connected across the constant voltage power source F. The connecting point E is connected to the input terminal of an operational amplifier 18, which is also connected to operate as a voltage follower circuit. A variable resistor 17, which is adjustable in accordance with the manual shutter speed selected, is connected as a source resistor of a field effect transistor 17a, which constitutes a source follower circuit, and is also connected to the collector of a transistor 17b. The latter transistor is connected as a diode.

A logarithmic expansion transistor 13 has its emitter connected to the output of operational amplifier 18, its base (C point) permanently connected to the switch arm of an ES-EE operation change-over switch 8, and its collector connected to an integrating capacitor 12 and a memory switch 11. A resistor 15a and a constant voltage diode 15, such as a zener diode, are connected in series across the power source F. The connecting point between 15 and 15a is connected to one input terminal of a comparator 14, the other input terminal being connected to the collector of transistor 13. The output terminal of comparator 14 is connected to a magnet 16 for ES mode operation.

A comparator 7, which receives the outputs at the points B and C, has its output connected to one of the input terminals of an OR gate 9. The other input terminal of the OR gate 9 is connected to the connecting point between a resistor 6 and an EE trigger switch 5, which is connected in series with the power source F. The output terminal of the OR gate 9 is connected to a magnet 10 for EE mode operation.

The operation of the above circuit will now be described.

The relationship between the resistance $R_1$ of the variable resistor 1, the voltage $V_1$ between the ends thereof, and the electric current $_1$ flowing through the transistors 1a and 1b is determined by the following equation:

$$i_1 = V_1/R_1 \tag{1}$$

The voltage $V_A$ at the point A can be expressed from the logarithmic compression characteristics between the base and the emitter of the transistor by the following equation:

$$V_A = 2 \cdot h \log(i_1/i_s) \tag{2}$$

where:
$h = K \cdot T/g$;
K : Boltzmann Constant;
g : Charge of Electron; and
$i_s$: Saturated Inverse Current between Base and Emitter of the Transistor.

Here, it should be noted that the transistors 1a, 1b, 3a, 13, 17b, 19a and 19b have the same logarithmic compression characteristics between their base and emitter. It should also be noted that transistor 13 has been referred to as a logarithmic expansion transistor. The difference in terminology is only to describe the use to which the logarithmic element is put. If used to develop a voltage which is the log of a current applied, the term compression is applied. If used to develop a current which is proportional to a number raised to the power corresponding to the voltage, the term expansion is applied. In either case the basic logarithmic nature of the I-V characteristic of the elements are the same. Also it is noted that all logarithms are to the base $e$ unless specifically noted otherwise.

The voltage $V_B$, between the base and emitter of the transistor 3a, is a function of the photo-current $i_p$ of the photo diode, according to the following equation:

$$V_B = h \log(i_p/i_s) \tag{3}$$

The relationship between the resistance $R_2$ of the resistor 17, the source current $i_2$ of the field effect transistor 17a, and the voltage $V_{GS}$ between its source and gate, is expressed by the following equation:

$$i_2 = V_{GS}/R_2 \tag{4}$$

Therefore, the voltage $V_D$ between the base and emitter of the transistor 17b can be expressed as:

$$V_D = h \log(i_2/i_s) \tag{5}$$

Likewise, the current $i_3$ flowing through the transistors 19a and 19b is expressed, by the following equation:

$$i_3 = V_2/R_3 \tag{6}$$

where $R_3$ is the resistance of variable resistor 19. Then, the voltage $V_E$ at the point E can be expressed by the following equation:

$$V_E = 2 h \log(i_3/i_s) \tag{7}$$

The variable resistors 1 and 19 are made to correspond to the APEX indicating quantities Sv and Av of the film sensitivity and the aperture level. This is achieved conventionally by setting the variable resistors to satisfy the following equations:

$$R_1 = k_1 \cdot 2^{-0.5 Sv} \tag{8; and}$$

$$R_3 = k_3 \cdot 2^{-0.5 Av} \tag{9}$$

where:
$k_1$ : Proportionality Constant; and
$k_3$ : Proportionality Constant.

The variable resistor $R_2$ is so preset that the source current $i_2$ of the field effect transistor 17a is expressed for the APEX indicating quantity Tv of the shutter speed by the following equation:

$$i_2 = k_2 \cdot 2^{Tv} \tag{10}$$

where:
$k_2$ : Proportionality Constant.
Additionally, as is well known, the relationship between the photocurrent $i_p$ and the APEX indicating quantity Bv of the brightness of an object is expressed by the following equation:

$$i_p = k_4 B = k_5 \cdot 2^{Bv} \tag{11}$$

where:
$k_4$ : Proportionality Constant; and
$k_5$ : Proportionality Constant.

EE Operation

To place the circuit in the EE mode, the mode changeover switch 8 is connected to terminal EE so as to provide a connection between the points C and D. When the EE trigger switch 5 is closed, the level at the point G is high, so that the output of the OR circuit 9 is also at a high level irrespective of the output of the comparator 7 (the level at the point H), thus keeping the EE operation magnet 10 energized. The EE trigger switch 5 is used to eliminate the blocking of power to the EE operation magnet 10 during photometry.

The relationship between the input to the comparator 7, or the voltage at the points B and D, and the voltage at the point H is as follows:

The voltage at the point H is high when the voltage at the point B is equal to or higher than that at the point D; and the voltage at the point H is low when the former is lower than the latter. Here, the voltage levels at the points B and D are expressed, respectively, by the following equations:

Voltage Level at Point $B = V_A + V_B = 2h \log(i_1/i_s)$
$+ h \log(i_p/i_s)$ (12); and Voltage Level at Point $D = V_E + V_D = 2h \log(i_3/i_s)$
$+ h \log(i_2/i_s)$. (13)

Next, the EE trigger switch 5 is released in synchronism with the operation of a release 32 (FIG. 2), and the aperture level is progressively reduced by the action of a governor mechanism 25. In accordance with the aperture level thus reduced, the resistance of the variable resistor 19 is varied to progressively boost the voltage at the point E. When the voltage at the point D becomes equal to that at the point B, power supply to the EE operation magnet 10 is blocked to thereby stop the reduction of the aperture level.

More specifically, the following relationship is derived from the equations (12), (13), (8), (9), (10) and (11)

$$\frac{1}{\log_2 e}\{(Sv + Bv) - (Av + Tv)\} + \log\left(\frac{k_3^2}{k_1^2} \cdot \frac{k_5}{k_2}\right) = 0 \quad (14)$$

where:

$$\frac{k_3^2}{k_1^2} \cdot \frac{k_5}{k_2} = 1 \quad (15)$$

then the aperture level is determined when the equation $Sv + Bv = Av + Tv$ holds, thus affording exposure of proper level. It will also be noted that the assumption is made that $V_1 \div V_2$. This is a true assumption because substantially all of the supply voltage F appears across $R_1$ and $R_3$, respectively.

On the other hand, the exposure time can be obtained as follows. Since the voltage $V_C$ between the base and emitter of the logarithmic extension transistor 13 is equal to the voltage between the base and emitter of the compression transistor 17b, the collector current $i_c$ of the logarithmic extension transistor 13 can be expressed by the following equation:

$$i_c = i_2 = k_2 \cdot 2^{Tv} \quad (16)$$

When, in this instance, the memory switch 11 is released in synchronism with a front screen, the voltage $V_C$ across the capacitor 12 can be expressed, if the capacity of the capacitor is denoted $C_C$, by the following equation:

$$V_C = i_c \cdot t / C_C \quad (17)$$

If the Zener voltage of the constant voltage diode 15 is denoted $V_S$, the time period $t_1$, from the release of the memory switch 11 to the blocking of the power supply from the ES operation magnet 16, can be defined by the following equation:

$$t_1 = V_S \cdot C_C/i_c = (V_S \cdot C_C/k_2)\, 2^{-Tv} \quad (18)$$

By selecting the values $V_S$, $C_C$ and $k_2$ to satisfy the following equation:

$$V_S \cdot C_C/k_2 = 1 \text{ (sec)} \quad (19)$$

the shutter open time $t_1$ becomes, $$t_1 = 2^{-Tv} \text{ (sec)} \quad (20),$$

which provides the proper exposure time due to the manual setting of resistor 17.

As has been described above, the exposure time obtainable has a value which is preset manually, and the aperture level obtainable has the level which is set automatically for the proper exposure, thus accomplishing the desired EE operation.

ES Operation

During the ES operation, the ES-EE operation change-over switch 8 provides a connection between the points C and B. The aperture level is manually set, and the resistor 19 has a resistance value corresponding to the determined aperture level.

The voltage $V_C$ between the base and emitter of the logarithmic expansion transistor 13 is expressed by the following equation:

$$V_C = V_A + V_B - V_E \quad (21)$$

$$= h \log \frac{k_5}{k_1^2} \cdot \frac{k_3^2}{i_s} \cdot 2^{(Sv + Bv - Av)}$$

Here, this equation (21) can be changed in view of the equation (15) into the following equation:

$$V_C = h \log(k_2 \cdot 2^{(Sv + Bv - Av)}/i_s) \quad (22)$$

The collector current $i_c$ of the logarithmic extension transistor 13 is expressed as follows:

$$i_c = k_2 \cdot 2^{(Sv + Bv - Av)} \quad (23)$$

From those equations (16), (17), (18), (19) and (20), the shutter time $t_2$ can be deduced as in the following:

$$t_2 = 2^{-(Sv + Bv - Av)} \text{ (sec)} = 2^{-(Tv)} \quad (24)$$

Thus during ES operation, the setting of resistor 17 has no effect, the exposure time being determined automatically from $V_A$, $V_B$ and $V_E$.

ES-EE Operation

Under this operating condition, the ES-EE change-over switch 8 is connected to provide a connection between the points C and B. In this case, the aperture control and the shutter control are accomplished automatically.

From the equation (14), the aperture level is expressed as follows:

$$Av = Bv + Sv - Tv \quad (25)$$

and from the equation (24), the shutter speed is expressed as follows:

$$t_2 = 2^{-(Sv + Bv - Av)} \quad (26)$$

If it is denoted in the above equation (25) that the fully open aperture level of the lens be $Av_{min}$ and that the minumum aperture level be $Av_{max}$, then the shutter speed $t_2$ for the condition that $Av$ is smaller than $Av_{min}$ can be expressed by the following equation:

$$t_2 = 2^{-(Sv = Bv - Av_{min})} \quad (27)$$

and the shutter speed for the condition that $Av$ is larger than $Av_{max}$ can be expressed as follows:

$$t_2 = 2^{-(Sv = Bv - Av_{max})} \quad (28)$$

This shutter speed $t_2$ can be expressed as in the equation (26) for the condition that $Av$ is equal to or smaller than $Av_{min}$ but equal to or larger than $Av_{max}$.

Figure 3:
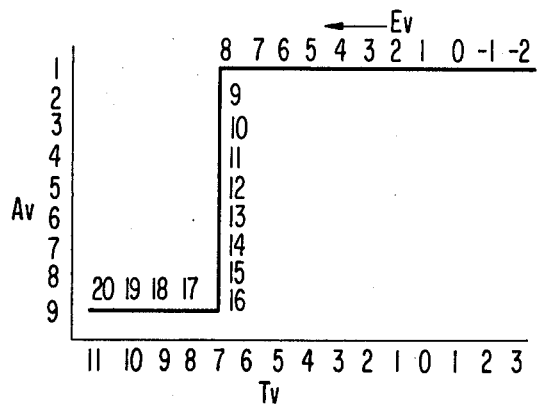
FIG. 3 is a graphical presentation of the program of the exposure control device according to the present invention.

More specifically, if the variable resistor is fixed so that Tv may assume the value of 7, it is possible to accomplish the ES-EE operation which is programmed as shown in FIG. 3. Thus, with the resistor 17 set to provide a Tv value at 7, during EE-ES mode operation, the comparator H will shut down the EE operation electromagnet when, $$A_v = Bv = Sv = Tv.$$

Assuming that the Av determined by the above equation is between Av(MIN) and Av(MAX), inclusively, the resistor 19 will take on a value corresponding to the Av value mentioned above, and therefore the shutter speed, which is determined by $V_A$, $V_B$ and $V_E$ (not by $V_D$ in this case), will be that corresponding to Tv = 7. This is shown by the vertical line in FIG. 3.

Now, if the Av value satisfying the above equation is smaller than the $Av_{min}$ for the camera, the aperture will remain fully open because the output H of comparator 7 will be low immediately. Thus, resistor 19 will have a value corresponding to Av(min). The shutter time will then be controlled by Bv, Sv and $Av_{min}$ and will result in a value corresponding to a Tv shown by horizontal line 60 in FIG. 3.

The opposite condition occurs when the Av satisfying the equation, $$Bv + Sv = Tv + Av,$$

is larger than Av (max). Here, the shutter speed will be that corresponding to the Tv values along horizontal line 62.

It is noted that the camera will operate in this seemingly contradictory manner because when switch 8 is connected to ES, the resistor 17 does not control the shutter speed, except indirectly.

Figure 2:
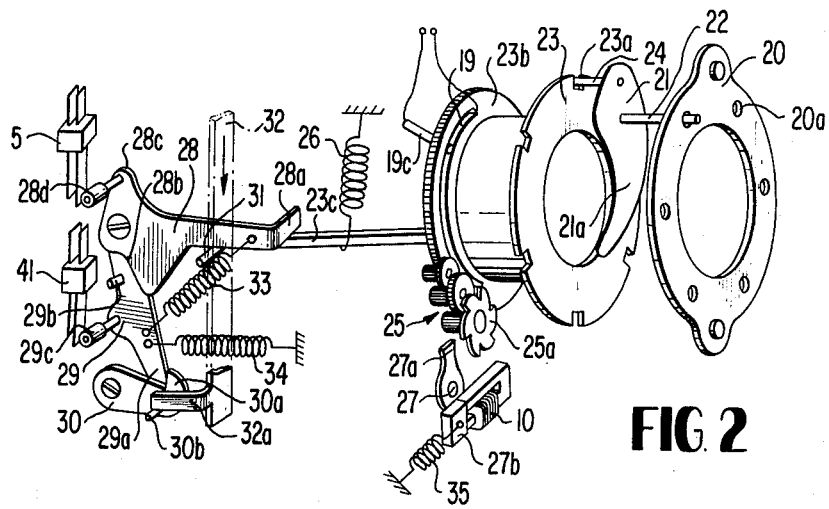
FIG. 2 shows one embodiment of an EE operation mechanism which is controlled by the circuit of FIG. 1.

FIG. 2 shows one embodiment of the EE operation mechanism which is controlled by the circuit of FIG. 1 during EE and EE-ES mode operations. A member 20 is formed with bores 20a, through which are to be inserted a plurality of pins 22 providing shafts of rotation for aperture control blades 21. Other side pins 24 of the aperture control blade 21 are fitted in notches 23a of an aperture control ring so that the aperture control blades may be closed when the aperture control ring 23 is turned in the clockwise direction as shown. At one side of the aperture control ring 23 is formed a gear portion 23b which is in meshing engagement with a group of governor mechanisms 25. On the gear portion 23b, moreover, there is formed an arm 23c which is made to extend toward the body side of a camera until it engages with the leading end 28a of an aperture swing lever 28. This arm 23c is turned onto a stopper 31 against the action of a spring 26, which is a power source for clockwise rotation of the aperture control ring 23, so as to set the aperture control blades 21 under the "fully open" condition.

Reference numerals 10 and 27 indicate an electromagnet and a ratchet of the control ring, respectively, and the ratchet 27 is made to have its leading end 27a engaging with a ratchet wheel 25a, which acts as the last stage of the grouped governor mechanism 25, and the other end coactive as an armature with the electromagnet 10.

Indicated at numeral 29 is an aperture drive lever, which is connected with the aperture swing lever 28 by means of a spring 33 having a stronger spring action than the spring 26. Before the shutter release operation, the aperature drive lever 29 is retained at its one end 29a by the action of a claw 30a of a retaining plate 30. A pin 28d, which is covered with an insulating material, is fixed to the other end 28c of the swing lever 28 to thereby render the trigger switch 5 for the EE operation conductive, while another pin 29c covered with an insulating material is also fixed to the drive lever 29 to thereby close a memory switch 41. Memory switch 41 provides the well known function of opening the buffer feedback link 4 to thereby store a voltage $V_B$ once the shutter release button is pressed.

When, in this instance, a release plate 32 is actuated from the outside of the camera in the direction of the arrow as shown, its projecting portion 32a pushes a pin 30b on the retaining plate 30 so that the retention of the drive lever 29 may be released by turning the retaining lever 30 in the clockwise direction. Then, the drive lever 29 is turned in the counterclockwise direction as shown by the action of a strong spring 34 so as to disconnect the contacts of the memory switch 41 and then to effect counterclockwise rotation of the swing lever 28 by resorting to the fact that a pin 29b pushes a cam surface 28b of the swing lever 28. The reason why the pin 29b and the cam surface 28b are at first positioned at a suitable spacing from each other is to render the switch inconductive for that particular time period.

As soon as the swing lever 29 starts its rotational motion, the trigger switch 41 is rendered inconductive to effect the operation in the electric circuit, as has been described hereinbefore. Immediately before this operation, the aperture control ring 23 and the gear portion 23b start their clockwise rotations with the aid of the action of the spring 26 together with the resistor 19, while the ratchet wheel 25a of the govenor portion 25 starts its counterclockwise rotation. After lapse of the operation time $t$, the electromagnet 10 is deenergized, and the control ring is stopped by retaining the wheel 25a at the ratchet 27a by means of a spring 35, thus determining the desired aperture level.

Incidentally, although omission is made in FIG. 2, the drive lever 29 and the ratchet 27 after their operations may either be set in the position of FIG. 2 upon the winding operation or be of the quick-return type.

Moreover, although the memory switch 41 of the shown embodiment is rendered nonconductive by the action of the aperture drive lever 29, it may be rendered conductive or nonconductive if the operation is carried out immediately before the operations of the aperture control blades 21 (the pop-up operation of a mirror should also be carried out if the camera is equipped with it).

Still moreover, the delay time of the electromagnet 10 (or the time period from the instant when the amplifier 7 is reversed to the instant when the armature 27b is released) and the operation delay of the mechanism can be regulated electrically.

Although not shown, the mechanical mechansim, which effectively prevents the ratchet 27 and the spring 26 from automatically controlling the diaphragm during ES or manual operation is well known. A lever not shown holds lever 27a so it cannot interfere with the rotation of ring 23b. Also a manual stop ring, which is set by the operator stops the ring 23b at the position set by the stop ring.

As has been described hereinbefore, according to the present device, the automatic exposure control operation can be selected at the discretion of the operator among those of the aperture dominant type, of the shutter dominant type and of the programmed type, thus providing an automatic exposure control device suitable for the aimed photography. Since, moreover, the electric circuit is arranged symmetrical for all the ES, EE and ES-EE operations, the exposure control can be accomplished without any temperature or power dependency.

What is claimed is:

1. An automatic exposure control device for a camera, said device being capable of accomplishing at least the aperture cominant exposure control operation and the shutter dominant exposure control operation, said device being of the type having a logarithmic compression circuit for developing voltages $V_E$, $V_D$, $V_A$ and $V_B$ dependent on the APEX indicating quantities Av, Tv, Sv and Bv, respectively, of aperture level A, manual exposure time T, film sensitivity S and brightness of an object B, so as to carry out the APEX operation in accordance with the relationship of $Av + Tv = Sv + Bv$; shutter speed control means for said camera having an input circuit means, said shutter speed control means being adapted to control the shutter speed in dependence upon the voltage applied to said input means, an aperture level determining means selectively operative to start adjustment of the aperture mechanism of said camera in response to the shutter release operation of said camera and to carry out said adjustment at a predetermined speed; said logarithmic compression circuit means including an aperture transducer means coactive with said aperture level determining means to develop said voltage $V_E$ dependent upon the Av quantity; the improvement being characterized by a. automatic aperture circuit means responsive to the voltages corresponding to the Bv, Sv and manually set Tv quantities for stopping the aperture level determining means when the aperture mechanism is closed down an amount to cause said developed voltage $V_E$ to become equal or greater than $(V_A+V_B-V_D)$, said automatic aperture circuit means being selectively connectable and disconnectable with said aperture level determining means for shutter dominant and aperture dominant operations, respectively, and b. switchable shutter circuit means for selectively applying to said input circuit of said shutter control circuit, a voltage dependent directly upon $V_D$ for shuter preferred operation and a voltage dependent upon $(V_A+V_B-V_E)$ for aperture dominant operation, wherein said switchable shutter circuit means comprises, a transistor having base, emitter and collector terminals, said emitter being connected to said voltage $V_E$, said collector being connected to said shutter speed conrol means, and switch means selectively connecting the base of said transistor to a point of voltage $V_A+V_B$ for aperture dominant operation and to a point of voltage $V_D+V_E$ for shutter dominant operation.

2. An automatic exposure control device for a camera, said device being capable of accomplishing at least the aperture cominant exposure control operation and the shutter dominant exposure control operation, said device being of the type having a logarithmic compression circuit for developing voltages $V_E$, $V_D$, $V_A$ and $V_B$ dependent on the APEX indicating quantities Av, Tv, Sv and Bv, respectively, of aperture level A, manual exposure time T, film sensitivity S and brightness of an object B, so as to carry out the APEX operation in accordance with the relationship of $Av + Tv = Sv + Bv$; shutter speed control means for said camera having an input circuit means, said shutter speed control means being adapted to control the shutter speed in dependence upon the voltage applied to said input means, an aperture level determining means selectively operative to start adjustment of the aperture mechanism of said camera in response to the shutter release operation of said camera and to carry out said adjustment at a predetermined speed; said logarithmic compression circuit means including an aperture transducer means coactive with said aperture level determining means to develop said voltage $V_E$ dependent upon the Av quantity; the improvement being characterized by a. automatic aperture circuit means responsive to the voltages corresponding to the Bv, Sv and manually set Tv quantities for stopping the aperture level determining means when the aperture mechanism is closed down an amount to cause said developed voltage $V_E$ to become equal or greater than $(V_A+V_B-V_D)$, said automatic aperture circuit means being selectively connectable and disconnectable with said aperture level determining means for shutter dominant and aperture dominant operations, respectively, wherein said automatic aperture circuit means comprises, a comparator circuit having first and second inputs and an output, said logarithmic compression circuit including a first connection to provide the sum of $(V_A+V_B)$ to said first input and a second connection to provide the sum of $(V_D+V_E)$ to said second input, and b. switchable shutter circuit means for selectively applying to said input circuit of said shutter control circuit, a voltage dependent directly upon $V_D$ for shutter preferred operation and a voltage dependent upon $(V_A+V_B-V_E)$ for aperture dominant operation, wherein said switchable shutter circuit means comprises, a transitor having base, emitter and collector terminals, said emitter being connected to said voltage $V_E$, said collector being connected to said shutter speed control means, and switch means selectively connecting the base of said transistor to a point of voltage $V_A+V_B$ for aperture dominant operation and to a point of voltage $V_D+V_E$ for shutter dominant operation.

3. An automatic exposure control device for a camera, said device being capable of accomplishing at least the aperture dominant exposure control operation and the shutter dominant exposure control operation, said device being of the type having a logarithmic compression circuit for developing voltages $V_E$, $V_D$, $V_A$ and $V_B$ dependent on the APEX indicating quantities Av, Tv, Sv and Bv, respectively, of aperture level A, manual exposure time T, film sensitivity S and brightness of an object B, so as to carry out the APEX operation in accordance with the relationship of $Av + Tv = Sv + Bv$; shutter speed control means for said camera having an input circuit means, said shutter speed control means being adapted to control the shutter speed in dependence upon the voltage applied to said input means, an aperture level determing means selectively operative to start adjustment of the aperture mechanism of said camera in response to the shutter release operation of said camera and to carry out said adjustment at a predetermined speed; said logarithmic compression circuit means including an aperture transducer means coactive with said aperture level determining means to develop said voltage $V_E$ dependent upon the Av quantity; the improvement being characterized by a. automatic aperture circuit means responsive to the voltages corresponding to the Bv, Sv and manually set Tv quantities for stopping the aperture level determining means when the aperture mechanism is closed down an amount to cause said developed voltage $V_E$ to become equal or greater than $(V_A+V_B-V_D)$, said automatic aperture circuit means being selectively connectable and disconnectable with said aperture level determining means for shutter dominant and aperture dominant operations, respectively, b. switchable shutter circuit means for selectively applying to said input circuit of said shutter control circuit, a voltage dependent directly upon $V_D$ for shutter preferred operation and a voltage dependent upon $(V_A+V_B-V_E)$ for aperture dominant operation, and c. the capability of accomplishing automatic exposure control operation of the ES-EE programmed type, said latter operation being carried out by setting Tv manually, selectively connecting said aperture circuit with said aperture level determining means, and operating said switchable shutter circuit means to apply said voltage $(V_A+V_B-V_E)$ to said shutter control input circuit.

* * * * *